J. H. BURGESS.
MINERAL CLASSIFYING DEVICE.
APPLICATION FILED JUNE 2, 1919. RENEWED DEC. 5, 1921.
1,424,339.
Patented Aug. 1, 1922.
2 SHEETS—SHEET 1.
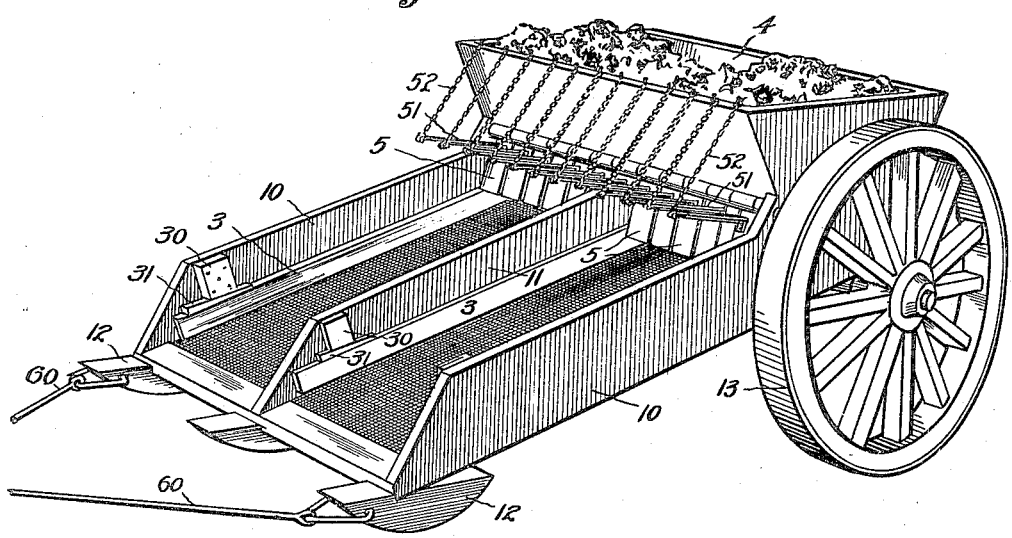
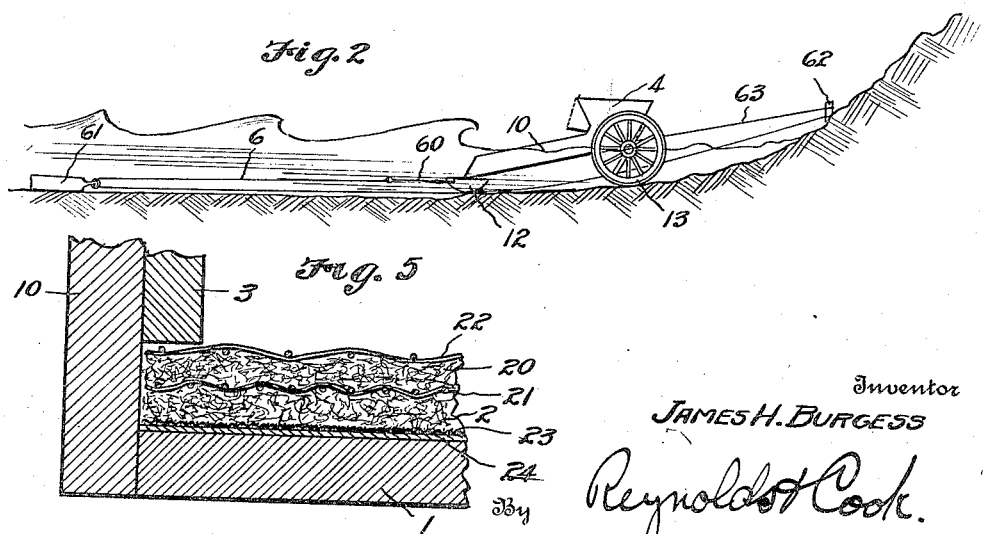
Inventor
JAMES H. BURGESS
By Reynold Cook.
Attorney

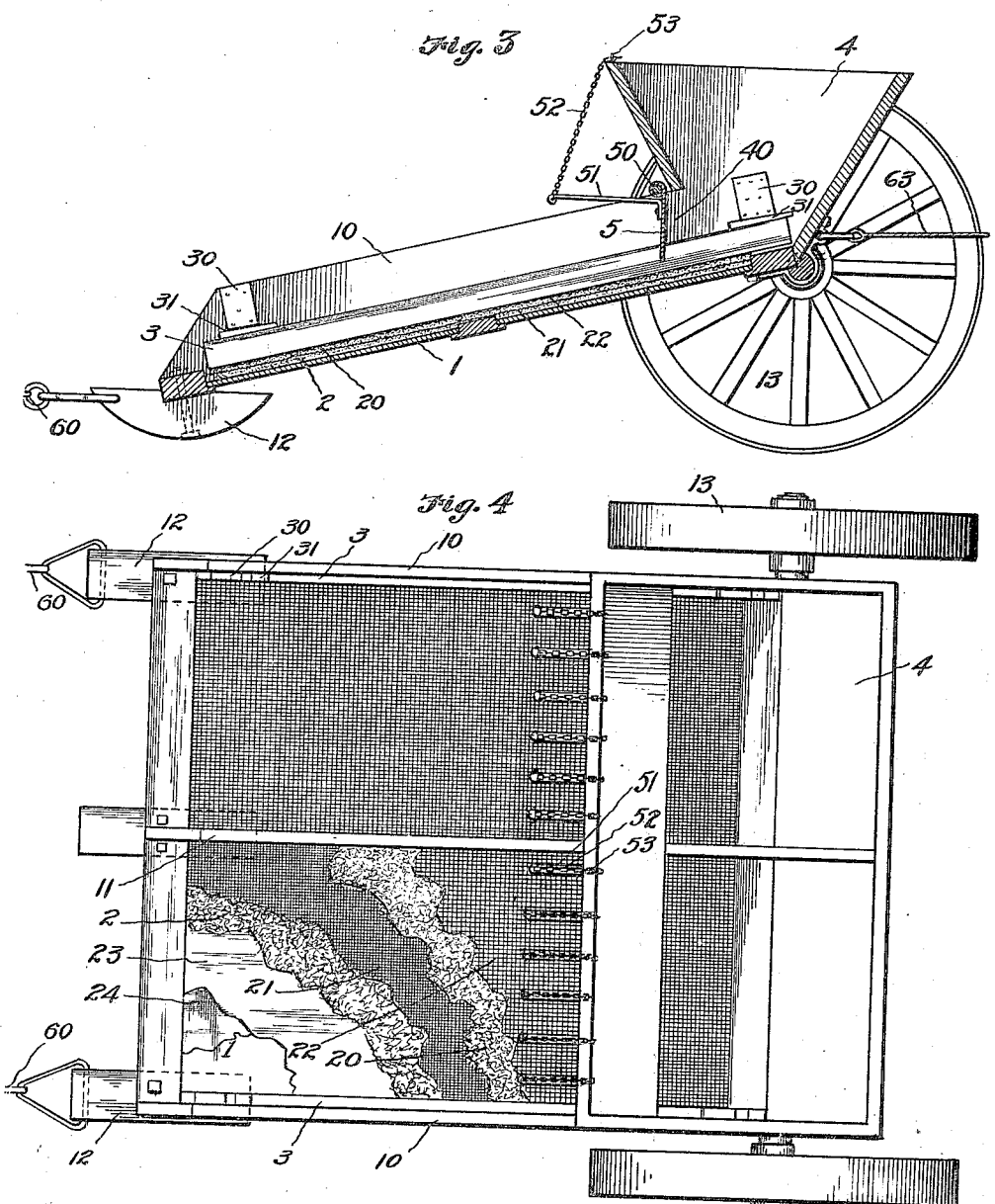

UNITED STATES PATENT OFFICE.

JAMES H. BURGESS, OF PORT ANGELES, WASHINGTON, ASSIGNOR OF ONE-HALF TO CLARA M. CLAYTON, OF SEATTLE, WASHINGTON.

MINERAL-CLASSIFYING DEVICE.

1,424,339.   Specification of Letters Patent.   Patented Aug. 1, 1922.

Application filed June 2, 1919, Serial No. 301,192. Renewed December 5, 1921. Serial No. 520,173.

*To all whom it may concern:*

Be it known that I, JAMES H. BURGESS, a citizen of the United States, and resident of Port Angeles, Clallam County, Washington, have invented certain new and useful Improvements in Mineral-Classifying Devices, of which the following is a specification.

My invention relates to mineral classifying or concentrating devices and is designed more particularly for handling placer dirt on beaches or on the shores of bodies of water, and is intended to secure the classifying of the material through the action of the waves and surf which occurs on all bodies of water.

One of the objects of my invention is to provide an apparatus which is capable of making use of the wave action found on bodies of water to wash and classify the material.

Other objects of my invention will appear from a study of the drawings and the following specification.

In the accompanying drawings I have shown my invention embodied in a form of construction which I now believe to be well adapted for the purpose and which I prefer to use.

Figure 1 shows in perspective my apparatus.

Figure 2 indicates somewhat the manner of placing the same while in use. Figure 3 is a longitudinal sectional elevation of the device.

Figure 4 is a plan view and Figure 5 is a section showing certain details of the construction thereof.

In constructing my device I provide a trough classifying table which is placed in an inclined position when in use, so that contents placed therein will flow out the lower and open end, and place this in such a position on the beach of a body of water that the waves, as they come in, will wash into the same and place the material to be classified at the upper end of the trough or table where it is washed by the waves as they flow in and out.

In the drawings 1 represents the floor of such trough or table. As herein shown, I have employed side members 10 and a similar partition 11, thus dividing the space into two parallel troughs. These are open at one end, the same being the end which is faced toward the body of water. The size of the apparatus and the number of troughs formed therein may be made anything which it is found practical to handle.

Upon the floor 1 is placed some type of mineral collecting and holding device. This in its purpose is analogous to the use of riffles, blankets and other equivalent devices which have heretofore been used in sluice boxes. The type of device which is employed for this purpose may vary widely and may be anything found best adapted for this purpose.

The type of device for this purpose which I have found to be very effective in handling the minerals ordinarily found in beach sands is illustrated in the drawings which consist of the following.

I have shown two layers 2 and 20 of a loose, fibrous material, the two layers being separated by means of a wire screen 21 and the upper layer covered with a wire screen 22. A fibrous material which I have found to work excellently for this purpose is ordinary excelsior. The screen 21 which is placed between the two layers of fibrous material is preferably of finer mesh than the uppermost covering screen 22. For the purpose of convenience in cleaning up the troughs and the removal of the collecting layers and the mineral caught therein, I prefer to place beneath the lowermost layer 2, a sheet, as 23, of cloth, this to be of a texture which would prevent any of the finest particles of mineral passing through the same. To render the bottom watertight we prefer to employ a layer 24 of zinc, or any suitable sheet metal.

For convenience in holding down these layers of collecting material, I have shown bars 31 extending along the side edge, which bars are held down by means of blocks 30 and wedges 31, as is clearly shown in Figure 1.

At the upper end of the trough, or the end opposite that which is open, I provide means for the supply of the mineral to be treated and this means may conveniently consist of a hopper 4, which is provided with an opening 40, discharging freely into the upper end of the trough. To regulate the flow of this material through this opening so as to permit passage of large bodies, such as good sized gravel or stones, and yet to be able to restrict the rate of flow, I have provided a series of gates, as 5, hinged at their upper edges, as at 50, so as to swing outward. When the waves washing into the trough are of sufficient force to reach the upper end of the trough they will wash down any material which can pass the gates. The force of the waves will also tend to close these gates.

To prevent from swinging too far inwardly by the pressure of the waves thereon, I prefer to provide some means limiting their inward swing. Such means, as illustrated, consists of providing each gate with an arm 51 extending horizontally outward, to which is connected a chain 52, which is secured, as at 53, to the wall of the hopper 4.

The lower end of the troughs or classifying table, is preferably mounted upon skids, as 12, so that it may be readily moved over the surface of the beach. The opposite or shore end is mounted in such a way that it will be supported at a higher level. This I have shown as being done by employing a pair of wheels 13. These wheels are preferable as means for supporting it, for the reason that the device may thus be easily moved from place to place.

To the lower or offshore end of the device, is attached a rope 6 by means of a bridle 60. This rope is carried to a pulley which is secured to an anchorage device, as 61, located far enough out to be covered at low tide, if the conditions will permit this. The rope 6 passes through a pulley carried by this off-shore anchor and thence back to the shore. This rope, or a second rope, as 63, is secured to the inner end of the device and both ropes extend to a shore anchor, as a stake 62. By suitable handling of these ropes the device may be moved out or in and its position relative to the level of the water and the wash of the waves, thus adjusted to suit the conditions existing at the time.

In operating this device it is intended to be placed so that the wash of the waves, as they come in shore, will wash into the troughs and flow to the upper end thereof, thus loosening and washing down with each ebb a certain amount of the material contained in the hopper 4. The flow of the contents back and forth in the trough will thoroughly wash and classify the material, removing everything except the heavier particles thereof. These heavier particles will sink to and be caught by the collecting means which are carried by the floor of the device. By the use of this device it is possible to use the waves of a body of water to secure the classifying desired, and thus avoid expensive work for the purpose of securing water. It is only necessary to deposit the earth to be classified in the hopper and the wash of the waves will perform the classifying.

It is evident that many features of construction herein described may be varied in detail without, however, seriously changing the principles employed, or the manner of operating. The chief feature of my invention is the provision of means whereby the ebb and flow of waves may be utilized for the classification of mineral bearing earths.

What I claim as my invention is:

1. The method of classifying materials which consists in supplying the material to the higher end of an inclined floor having a collecting and holding surface and subjecting it to water having a wave action in the direction of the upward inclination of the floor.

2. The method of classifying materials which consists in supplying the material to the higher end of an inclined floor having a collecting and holding surface which is partially submerged and subjecting it to water having a wave action in the direction of the upward inclination of the floor.

3. The method of classifying material which consists in supplying the material to one end of a floor having a collecting and holding surface and subjecting it to water having a wave action entering at the other end of the floor.

4. A device for utilizing wave action upon a shore for classifying minerals, comprising a trough having one end open and a collecting and holding surface, a mineral receiving hopper extending across the other end, and having a discharge opening at the lower edge of the side facing the discharge, and a series of plates hinged to hang in front of said opening, and means for limiting the inward swing of said plates, and means for supporting the trough to incline down to its open end.

Signed at Seattle, Washington this 14th day of May 1919.

JAMES H. BURGESS.